July 4, 1961  A. G. ROWE, JR  2,990,581
PROCESS FOR VACUUM THERMOFORMING
Filed July 14, 1959  3 Sheets-Sheet 1

INVENTOR
ARTHUR G. ROWE, JR.

BY
ATTORNEY

July 4, 1961  A. G. ROWE, JR  2,990,581
PROCESS FOR VACUUM THERMOFORMING
Filed July 14, 1959  3 Sheets-Sheet 2

INVENTOR
ARTHUR G. ROWE, JR.

BY

ATTORNEY

CURVE RELATING MINIMUM WALL TAPER VS. DEPTH/DIAMETER RATIO
TAPER · 0° - 7°
(ABOVE DEPTH/DIAMETER RATIO OF 12, 7° IS MINIMUM TAPER)

PLUG NOSE DIAM. AS % OF BOTTOM DIAM. — 35%
PLUG NOSE AREA AS % OF BOTTOM AREA — 12%
DRAW-DOWN RATIO — 82%

INVENTOR
ARTHUR G. ROWE, JR.

United States Patent Office 2,990,581
Patented July 4, 1961

2,990,581
PROCESS FOR VACUUM THERMOFORMING
Arthur George Rowe, Jr., Wilmington, Del., assignor to E. I. du Pont de Nemours and Company, Wilmington, Del., a corporation of Delaware
Filed July 14, 1959, Ser. No. 827,031
2 Claims. (Cl. 18—56)

This invention is concerned with a process for vacuum thermoforming of generally concave, hollow articles from thermoplastic resin sheets. More particularly, it is concerned with a process for plug-assist vacuum thermoforming of deep-drawn shapes which process employs novel assist-plugs whereby the concave-shaped articles formed have walls and bottoms which are more uniform in thickness and, therefore, said articles utilize material most efficiently to provide improved stiffness and rigidity. This application is a continuation-in-part of application S. N. 667,893, now United States Patent 2,910,728, issued November 3, 1959, which was filed on June 25, 1957, by Arthur G. Rowe.

Vacuum thermoforming whereby generally concave, hollow articles are formed from sheets of thermoplastic resin is well known to the art of plastics fabrication. It offers an economical and rapid method for fabricating plastic articles from sheets without the use of the high pressures and temperatures required for injection molding. The general procedure followed in vacuum thermoforming processes is to clamp a sheet of thermoplastic resin in a frame, soften it by heating, conveniently by means of radiant heat, remove the heat source, press the softened sheet tightly over the surface of a warm die having one or more hollowed-out cavities in the shape of the desired articles, and to draw the sheet down onto the die surfaces by evacuation of the air trapped between sheet and die by drawing the air out through a number of small ports or pores in the die surface which lead to an internal hollow core which is connected to a vacuum source; finally, the thermoplastic resin is set in the shape of the die by cooling which is accomplished by heat transfer from the hot resin to the warm die on the convex side of the article and to atmosphere on the concave side.

The process of thermoforming as described hereinabove has been modified, as is well known to the art, where it is necessary to draw the thermoplastic sheet into deep cavities, particularly those in which the depth-to-base diameter ratios are greater than about 1/2. In such cases the operation of the unmodified process of vacuum thermoforming results in articles with very thin bottoms and thin lower walls due to greater stretching of the softened thermoplastic sheet in these areas. Therefore, the method known as "plug-assist" thermoforming was developed.

The initial steps in this process are the same as for the original vacuum-forming process. However, before applying the vacuum to draw the thermoplastic sheet down against the concave die surfaces, a tapered, blunt-nosed plug is employed to push the sheet from 60% to 95% of the way down into the die, then vacuum is applied through pores in the die surface to pull the sheet off the plug and down against the die surfaces. This process has been used commercially for vacuum thermoforming of polystyrene sheet and acrylic sheet. The motion of the plug provides a mechanical stretching action. The material is distributed over the plug surface with fairly uniform thickness since the softened polystyrene sheet will slip over the surfaces of the plug provided the plug surfaces are maintained at the proper temperature. However, where this same process (whereby the plug is used solely for mechanical stretching) is applied to a sheet of certain other types of resin, such as polyethylene resin, the results are unsatisfactory. Many resins, including polyethylene, when softened by heat, do not slip easily over the plug surfaces. As a result, the portion of the sheet which is to form the walls of the articles is drawn down thin while the portion of the sheet on the bottom of the plug remains at or near its original thickness. Then when the vacuum is applied and the thermoplastic sheet is pulled away from the plug and stretched down upon the concave die surface, further drawing of the thinned walls, particularly near the bottom, occurs while the thick section of resin from the bottom of the plug resists drawing and thus forms a thick section in the middle of the bottom of the fabricated article. Thus the final article is thinnest and weakest along the corner line where the walls and bottom join. This effect is most pronounced with resins such as polyethylene but may also be observed in certain shapes formed from resins such as polystyrene. For most purposes such articles are quite unsatisfactory. As a result, it has not in the past been thought practical to fabricate sheets of polyethylene or many other resins by vacuum thermoforming to deep-drawn shapes and the variety of shapes has been somewhat restricted where other resins, such as polystyrene, are employed.

Therefore, it is an object of this invention to provide a process whereby thermoplastic resins in the form of sheets can be vacuum thermoformed by deep drawing to give fabricated articles having walls and bottoms of substantially uniform thickness. It is another object of this invention to provide a process for plug-assist vacuum thermoforming in which the portion of the thermoplastic sheet which is to form the bottom of the fabricated article is predrawn, before the application of the vacuum, to substantially the same extent as the portion of the thermoplastic sheet which is to form the sides of the fabricated article is predrawn by the action of an assist-plug in pushing the sheet into the forming cavity. It is another object of this invention to describe assist-plugs for use in vacuum thermoforming of deep-drawn articles from thermoplastic sheets of resins such as polyethylene whereby fabricated articles having walls and bottoms of substantially uniform thickness may be obtained. Other objects and advantages of this invention will become apparent from the following description and the accompanying drawings.

It has now been discovered that the objects of this invention can be achieved by providing a method for deep-draw, plug-assist vacuum thermoforming of hollow articles having walls and bottoms of uniform thickness from sheets of a heat-softened thermoplastic resin which comprises a predrawing step and a subsequent final drawing and shaping step, said predrawing step consisting of mechanical drawing of the portions of the thermoplastic sheet which will form the sides of the shaped article by insertion of the assist plug simultaneously with the drawing of the portion of the sheet which will form the bottom of the shaped article by the application of a differential gas pressure through a passage in the assist plug to the two sides of the portion of the sheet which will form the bottom of the article, the simultaneous mechanical and differential gas pressure drawing being balanced to predraw both portions of the sheet to substantially the same thickness, and said subsequent final drawing and shaping of the sheet being achieved by the application of a vacuum through small ports in the concave forming surface of the die to draw the thermoplastic sheet against the concave forming surface.

By differential gas pressure is meant the application of a higher gas pressure to one side of the center portion of the softened sheet than to the other side. The higher pressure can be either on the plug side or on the die side of the sheet. When the higher pressure is applied on the die side of the sheet, the assist plug must have a hollowed-out depression in its nose into which the sheet is blown by the differential gas pressure created by the compression of the gas between the sheet and the concave die produced by the insertion of the assist-plug. When the higher pressure is applied on the plug side of the sheet by pumping gas through the passage in the plug to the sheet, the concave die serves to restrict the extent of drawing achieved by the differential gas pressure. In either case the balancing of the drawing of the edges and the center of the sheet is achieved by controlling the extent of insertion of the plug into the concave die so that the sides of the article are predrawn to the same extent as the geometry of the system permits the bottom of the article to be predrawn by the differential air pressure. This invention is further explained by the accompanying drawings and specific embodiments.

Figure 4A:
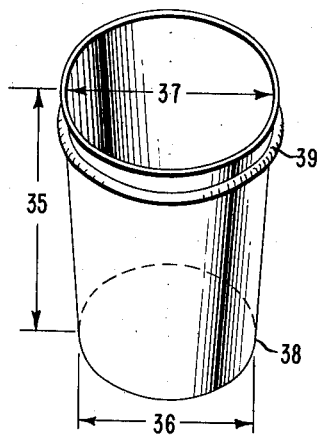
Figure 4B:
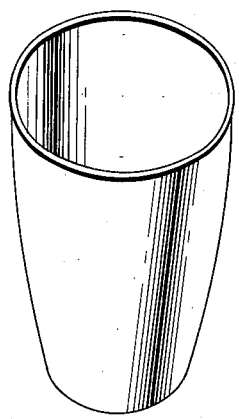
Figure 4C:
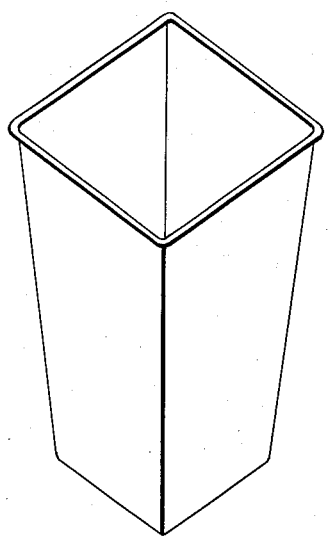
Figure 4D:

FIGURES 4A, B, C and D show containers having a depth-to-bottom diameter ratio greater than 1/2 such as may be fabricated from a thermoplastic resin by the use of this invention.

Figure 5:
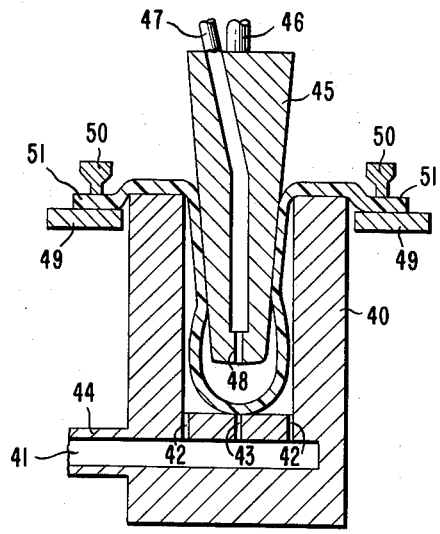

FIGURE 5 shows another modification of the apparatus suitable for use in the vacuum forming process of this invention.

Figure 6:
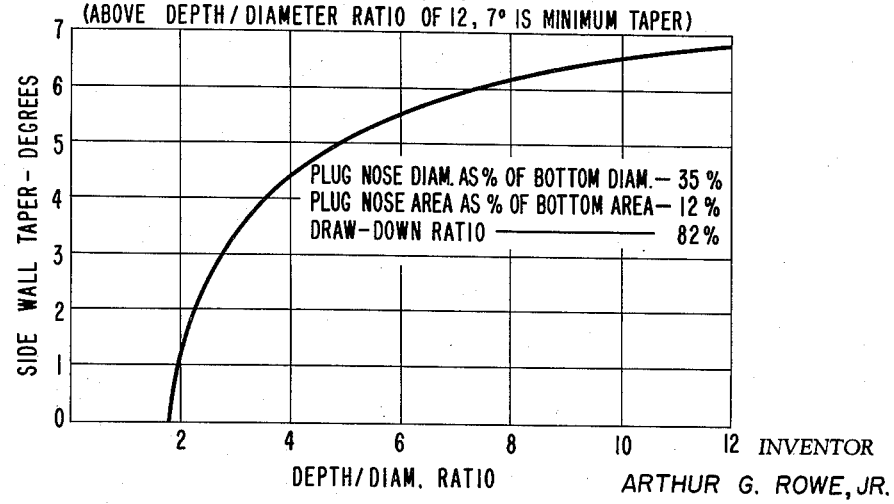

FIGURE 6 shows the graph of a curve relating minimum wall taper to depth-to-base diameter ratio as described hereinbelow.

In its broadest aspect, this invention comprises a process for deep-draw, vacuum thermoforming of generally concave shapes from sheets of a thermoplastic resin which sheets have been softened by heating to a temperature between the softening point of the thermoplastic resin and a temperature 100° F. above said softening point, and which process employs a forming die having a cavity with a base no larger in area than the top opening of said cavity and with sides which are tapered between 0° and 45° to the vertical axis of said cavity, and said cavity having a depth-to-base diameter ratio between 1/2 and a maximum which, for the case of a die cavity with walls of less than 7° taper, is determined by reference to the curve relating depth-to-base diameter ratio to minimum taper shown in FIGURE 6, and, for the case of a die cavity with walls having a taper between 7° and 45°, is a maximum of 20, the surface of said die-cavity being provided with a number of small ports leading from the forming surface of said die to an interior hollow core which can be evacuated to draw the air from the forming die cavity and to draw the plastic sheet down against the surfaces of said concave die, and which process employs means for pulling the plastic sheet tightly against the top surface of the die to form a seal around the outside of the concave opening, and which process employs a means for pushing the softened sheet of thermoplastic resin into the concave forming die cavity whereby the thermoplastic sheet is predrawn, before final forming in the region which will form the sides of the fabricated article, the improvement which comprises simultaneously predrawing to a like extent the sides and the base of the article undergoing fabrication, said pre-drawing of the base being accomplished by differential air pressure. It should be understood that by base diameter is meant the maximum linear dimension through the center of the base, whether or not the base is circular.

A more particular aspect of this invention comprises a process for deep-draw, vacuum thermoforming of generally hollow shapes (in which the area of the base portion is not greater than the area of the open top) from sheets of a thermoplastic resin, which sheets have been softened by heating to a temperature between the softening point of the thermoplastic resin and a temperature 100° F. above said softening point, which process employs a forming die comprising a cavity with sides which are tapered between 0° and 45° to the vertical axis of said cavity, and said cavity having a depth-to-base diameter ratio between 1/2 and a maximum which, for the case of a die cavity with walls of less than 7° taper, is determined by reference to the curve relating depth-to-base diameter to minimum taper shown in FIGURE 6 and, for the case of a die cavity with walls having a taper between 7° and 45°, is a maximum of 20, the surface of said die cavity being provided with a number of small ports leading from the forming surface of said die to an interior core which can be evacuated to draw the air from the forming die cavity and to draw the plastic sheet down against the surfaces of said concave die, and which process employs means for pulling the plastic sheet tightly against the top surface of the die to form a seal around the outside of the cavity, and which process employs a generally convex, tapered assist-plug comprising a cross-section of a shape similar to the cross-sectional shape of the aforesaid cavity in the forming die and a taper of from 1° to 30° greater than the aforesaid taper of the forming die cavity to push the sheet of thermoplastic resin down into the forming die cavity before the application of vacuum to the ports in the surface of said forming die, the improvement which comprises employing a tapered assist-plug in which the lower, smaller end has a diameter from 35% to 75% of the diameter of the base of the cavity in the forming die, and said smaller end of said plug is hollowed out to provide a depression with an internal, concave, surface inside the nose of the plug with a small port at the apex of said internal concave surface which port leads to a region of lower air pressure, said internal concave surface having an area between 40% and 100% of the area of the base of the aforesaid cavity in the forming die, and said internal concave surface circumscribing at its base at the smaller end of the plug an area, parallel to the base of the aforesaid cavity in the forming die, of from 12% to 45% of the area of said base of the forming die cavity, and said plug having a diameter at its upper end of from 50% to 98% of the diameter of the top of the forming die cavity, whereby the portion of the thermoplastic sheet which is to form the base of the fabricated article is predrawn by being forced into the plug depression by the force of the differential air pressure created by the action of the descending plug in compressing the air inside the concave forming die, before application of vacuum to the ports in the surface of the aforesaid forming die, to approximately the same extent as the portion of the thermoplastic resin which is to form the sides of the fabricated shape is predrawn by the descending motion of said plug in pushing the thermoplastic sheet from 60% to 95% of the way down into the cavity of the forming die, with the result that, after application of vacuum to the pores of the aforesaid forming die, the walls and the base of said fabricated article are drawn down to substantially equal and uniform thickness.

Alternatively, the process of this invention may be carried out, as indicated in FIGURE 5, by supplying compressed air through a small port in the center of the nose of an assist-plug as the plug pushes the softened, thermoplastic sheet into the die cavity; in this way the portion of the thermoplastic sheet on the bottom of the plug is predrawn by differential air pressure which causes said portion of sheet to expand out into the bottom of the forming die cavity at the same time that the sheet on the walls is drawn by the motion of the plug in pushing the sheet into the die cavity. The forming is then completed by the application of vacuum to the core inside the bottom of the forming die whereby air is withdrawn through the small ports leading from the core to the bottom of the forming surface as has been described hereinabove.

In the process, as shown in FIGURE 5 for one particular example, the forming die 40 has a round cavity with a depth-to-diameter ratio of 2 (2 inch diameter, 4 inches deep) and with walls having a 0° taper. Inside the bottom of the forming die there is a hollowed-out core 41, which can be evacuated by a vacuum pump (not shown) connected to a tube 44 leading to the core. A circle of small ports 42 around the bottom corner of the forming surface and another port 43 in the center of the forming surface lead to the hollow core. A tapered assist-plug 45, which is connected by a rod 46 to means for raising and lowering it, is employed. The dimensions and taper of the assist-plug are controlled by the limitations already given hereinabove. While the taper of the assist-plug must be from 1° to 30° greater than the taper of the walls of the forming die cavity, in this case it has a taper of 6°; the lower end of the assist-plug has a diameter from 35% to 75% of the diameter of the forming die; in this example the diameter is 50%. However, while a plug with a concave depression in its nose, as described hereinabove, may be employed, it is not essential in this method of carrying out the invention since compressed air is fed through a boring 47 and a small port 48 in the assist-plug to produce a convex instead of a concave bubble in the thermoplastic sheet. Therefore, the nose of the assist-plug may, in this case, be slightly convex as shown in FIGURE 5, where the bottom has a radius curvature of 4 inches.

In carrying out the process of the invention using this method, the steps are similar to those already described above. The thermoplastic sheet 51, which in this case is 60 mil thick polyethylene, is clamped to a frame by means of pressurized bars 50. The sheet is softened by heating about 30° above its softening point, then positioned over the die and pushed down around the top surface of the die, as indicated by the relative positions in FIGURE 5. Then the hot asist-plug (310° F.) is used to push the thermoplastic sheet from 60 to 95% of the way into the cavity. Simultaneously, compressed air is gradually fed through the bore 47 and the port 48 to blow outwardly a bubble of the resin on the nose of the plug. The final positions of plug and resin, just before application of vacuum to the core of the forming die are indicated by FIGURE 5; the resin sheet has been predrawn on both the sides and the bottom of the plug but it has not been formed into the desired shape. This forming is accomplished in the next step of the cycle when vacuum is applied to the pores 42, 43 of the forming die. The cycle is completed as described below in another example. While this method of carrying out the process of the invention is not the generally preferred method, it is most useful, particularly for vacuum thermoforming shapes such as shown in FIGURE 4-D where the depth-to-diameter ratio is near 2 and the wall taper is near 0° C.

Figure 1:
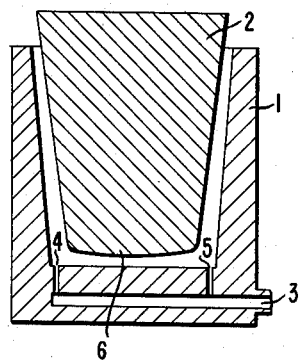
FIGURE 1 is a diagrammatic, cross-sectional view of a concave vacuum die (1) which is used in conjunction with a standard, tapered, blunt-nosed assist-plug (2) to form a deep-drawn-article from a thermoplastic sheet.

The general features of the first-described aspect of this invention will be more fully explained by reference to FIGURES 1 and 2. In FIGURE 1, which is representative of the equipment employed in prior art processes of deep-draw, plug-assist vacuum thermoforming, 1 is the concave-forming die, 2 is the tapered, blunt-nosed assist-plug, 3 is a hollow chamber inside the forming die which chamber can be rapidly evacuated by a vacuum pump (not shown), 4 and 5 are small ports, representative of a circle of ports at the bottom corner of the die, leading from the chamber 3 to the forming surface of the die, and 6 is the slightly rounded, blunt nose of the plug which has a diameter of from 75% to 95% of the diameter of the bottom of the forming die 1. When apparatus of this general description is employed to form a sheet of polyethylene into a hollow article, the action of the descending plug draws down the portion of the polyethylene which will form the walls of the article while the polyethylene on the bottom of the plug remains undrawn and thick because the hot polyethylene will not slip over the corners of the end of the plug. When vacuum is subsequently applied to pull the sheet down against the forming die, the drawn, thin section is drawn still more while the thick area of resin from the bottom 6 of plug 2 resists drawing and remains as a thick disc of resin in the middle of the bottom of the shaped article. As a result, the fabricated article has walls decreasing in thickness from top to bottom and is very thin and weak along the corner line joining the walls to the bottom. Obviously, this represents a very uneconomical use of the thermoplastic resin and generally results in an unsatisfactory fabricated article.

Figure 2:
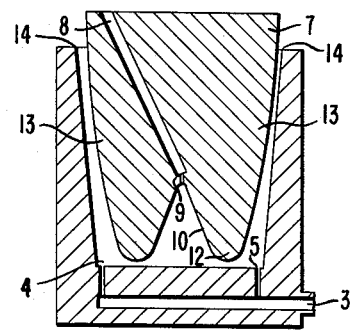
FIGURE 2 is a cross-sectional view of a concave vacuum die (1) identical with die 1 of FIGURE 1, but with an assist-plug (7), embodying the general features of a novel plug suitable for carrying out the process of this invention.

In FIGURE 2, which is representative of the apparatus employed in a generally-preferred method for carrying out the process of this invention, the concave forming die 1 is the same die shown in FIGURE 1 with the same provisions for applying vacuum from chamber 3 through a circle of pores represented by 4 and 5. However, the assist-plug 7 is of novel design, incorporating a number of features which, in combination, provide novel apparatus suitable for carrying out the fabricating process of this invention. Referring to the plug 7 of FIGURE 2, 8 is a hollow boring in the plug which, at its upper end, leads to a region of lower pressure which, in the operation of the process, may be either atmospheric pressure or a vacuum, and, at its lower end, is connected by a small port 9 into the apex of a hollowed-out cavity inside the end of the plug. This hollowed-out, concave surface is constructed with a surface area of from 50% to 100% of the area of the bottom 4—5 of the concave-forming die. Furthermore, the plug 7 is constructed with a sharper taper than the plug 2 of FIGURE 1 so that the volume of thermoplastic sheet encompassed by the bottom of the plug between points 11 and 12 is equal to the volume of resin which it is desired to distribute uniformly over the bottom of the fabricated article; usually it is preferable to form articles in which the thickness of the bottoms is approximately equal to the thickness of the walls. The sides 13 of plug 7 are tapered, either by a straight or a parabolic curvature. The diameter of the plug is such that when the plug reaches its position of maximum penetration into the die 1, the distance between the walls 13 of the plug, and the edges 14 of the die at the top of the die is from two to ten times the thickness of the thermoplastic sheet used. The taper of the walls 13 of the plug 7 will be greater by from about 1° to 30° than the taper of the walls 14 of the concave-forming die 1, which taper will make an angle between 0° and 45° with the vertical. While the tapered walls of the plug 13 may be straight line, it is preferable to construct them with a parabolic curvature near the bottom of the plug as shown in FIGURE 2. The annular surface 11 and 12, joining the internal concave surface 10 with the external tapered surface 13, may be constructed with a radius of curvature of from 1/32 inch to 1/2 inch, depending upon the amount of resin it is desired to deposit along the corner joining the walls and bottom of the shaped article. The portion of the thermoplastic sheet contacted by the annular surface 11, 12 may not be drawn down, either by the descending motion of the plug or by the subsequent vacuum-drawing as much as the rest of the sheet so it may, if desired, provide a region of strength at the bottom corner of the drawn, shaped article.

In brief, the process of this invention, which is a vacuum thermoforming process, employs a pre-stretching step where mechanical pressure stretches the outer area of the hot sheet, while at the same time, fluid pressure concurrently stretches the center area to a like extent. This pre-stretching operation then is followed by a shaping step where all areas of the plastic sheet are uniformly stretched concurrently by fluid pressure. Thus, the method comprises two steps which follow in rapid succession. This process is so designed that inherently it maintains a substantially uniform thickness of the plastic sheet throughout the pre-stretching and final stretching operations.

Figure 3:
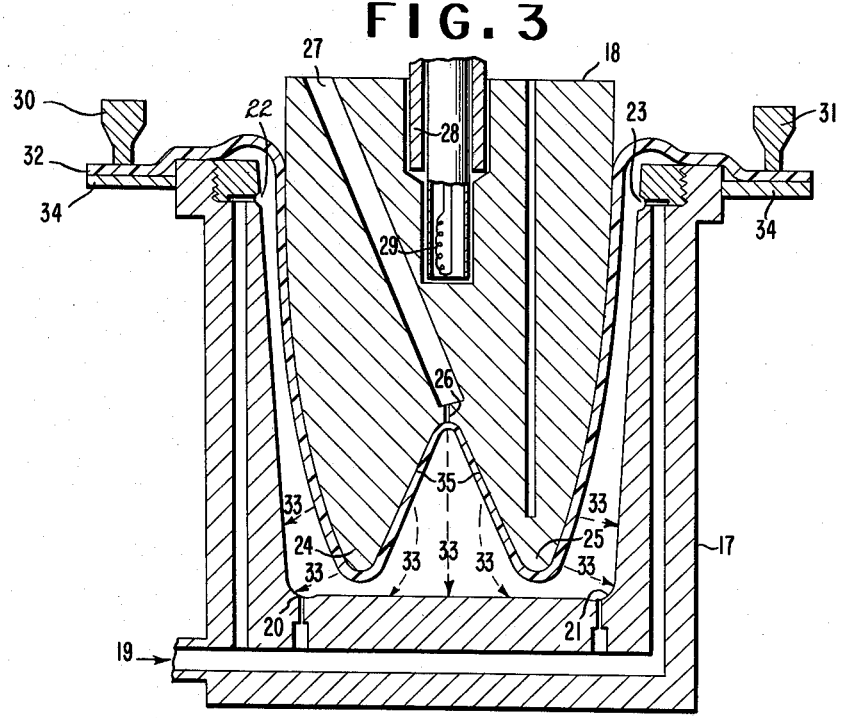
FIGURE 3 shows in more detail the design of one modification of the apparatus suitable for use in the vacuum-forming process of this invention.

The process of this invention will be further illustrated by a specific example, the vacuum thermoforming from polythylene sheet of round containers, illustrated by FIGURE 4-A, using the forming die and novel assist-plug illustrated in FIGURE 3.

As illustrated by FIGURE 4-A, which shows the fabricated container, the vertical depth of the container 35 is 4 inches, the diameter of the bottom 36 is 3 inches, and the diameter at the top of the container 37 is 3½ inches (all diamensions are outside); thus the walls of the container are tapered to make a 4° angle with the vertical axis of the container. The bottom corner of the container 38 has a ⅟₁₆ inch radius of curvature; ⅜ inch from the top of the container there is a notch 39 to hold a snap-on lid.

The construction of the vacuum-forming die and novel assist-plug are illustrated diagrammatically in FIGURE 3 which shows the novel plug 18 at the point of maximum descent into the die 17. This figure illustrates the point in time during the forming cycle when the thermoplastic sheet 32 has been pushed into the forming die, but just before the application of vacuum to draw the sheet down onto the forming surface of the die. The forming surface of the die 17 has the same dimensions as the outside dimensions of the container shown in FIGURE 4-A. The die, which may be constructed of aluminum, has corings 19 cut out inside to which vacuum can be applied. A circle of small ports, indicated by 20 and 21, lead from this coring to the bottom of the forming surface. Another circle of ports 22, 23 lead from the coring to a notched ring which will form the lid-notch. Not shown is the provision for heating the forming die, which is maintained at a temperature from 20° to 150° F. below the softening temperature of the resin.

The plug 18, which may be constructed of aluminum also, has an overall height of 4 inches. Its diameter at the top is 3¼ inches while at the bottom, its diameter, between points 24 and 25, is 1⅝ inches. In the bottom of the plug cavity in the shape of a cone is hollowed out having a vertical height of 1.254 inches between the bottom 24, 25 of the plug and the apex 26 of the hollowed-out cone. The sides of the cone make an angle of 25° with the vertical. The diameter of the hollowed-out conical depression is 1.42 inches at its base. The area of the conical surface is approximately 3.2 square inches which is 45% of the area (7.1 sq. inches) of the bottom of the forming die. At the apex 26 of the concave conical surface, a small opening leads to a drilled-out passage 27, leading to the atmosphere. A vertical post 28 having a diameter of 1 inch leads from the center of the top of the plug to a mechanism, not shown, for raising and lowering said plug. Means 29 are provided for heating the plug and maintaining it at any desired temperature equal to or above the softening temperature of the resin.

The process followed in using this novel assist-plug in the vacuum thermoforming of a thermoplastic sheet is as follows: The sheet 32 is clamped to a frame 34 by pressurized bars 30, 31 (plus two more at right angles, not shown in the diagram). This assemblage is automatically transported to a region where heat is applied to soften the resin. The frame 34, containing the softened thermoplastic sheet is then transported back away from the heat and positioned over the die 17; then the die is raised up against the softened sheet, or the frame is lowered down around the outside of the top surface of the die, thus forming a seal between the resin sheet and the outside top corner of the die, as indicated by the relative positions of die 17 and frame 34 in FIGURE 3. The heated plug 18 is then pushed down from 60% to 95% of the way into the forming die until it reaches a position such as indicated in FIGURE 3; this compresses the air inside the die between the sheet and the surface of the forming die. This compression of the air produces a differential air pressure which forces the plastic sheet 32 up into the cavity 35 in the bottom of the plug, since pressure there is relieved to the atmosphere; thus by the action of the differential air pressure, this portion of the sheet is drawn to substantially the same extent as that on the outer walls of the plug. At this point in the cycle, the condition indicated by FIGURE 3 is reached. Next vacuum is applied at 19 and the air compressed between the plastic sheet and the surface of the forming die is drawn out through the two circles of ports 20—21 and 22—23; a vacuum then is formed in the region between the sheet and the die whereby the thermoplastic sheet is drawn away from the plug and forced down upon the surfaces of the concave forming die by the pressure of the atmosphere; the dotted lines 33 of FIGURE 3 indicate this movement of the thermoplastic sheet. Finally, the plug is withdrawn, the thermoplastic resin is set into the formed shape by heat transfer to the air and to the forming die, and the fabricated container is removed from the die, means being provided, if desired, to trim the excess sheet from around the top of the container.

The use of this forming die and novel assist-plug for forming 60-65 mil polyethylene sheets into containers is illustrated by the data of Table I.

TABLE I

*Vacuum-forming of polyethylene sheets*

| Polyethylene Resin Used | Units | Runs | | | |
|---|---|---|---|---|---|
| | | I | II | III | IV |
| | | A | A | B | B |
| Sheet thickness | mils | 63 | 63 | 65 | 65 |
| Sheet Area Heated | inches² | 8 x 8 | 8 x 8 | 8 x 8 | 8 x 8 |
| Plug Used | | I | II | I | II |
| Plug Temperature | ° F | 320 | 320 | 320 | 320 |
| Mold Temperature | ° F | 180 | 180 | 160 | 160 |
| Distance of plug from bottom | inches | ½ | ⅝ | ½ | ⅝ |
| Penetration into Cavity, Percent of Total | percent | 87.5 | 84.4 | 87.5 | 84.4 |
| Thickness Measurements: | | | | | |
| Center of Bottom | mil | 40 | 23 | 39 | 20 |
| Corner | mil | 18 | 20 | 19 | 16 |
| Lower Sidewall | mil | 24 | 28 | | |
| Upper Sidewall | mil | 24 | 33 | | |
| Ratio: Center of Bottom/Corner | mil/mil | 2.22 | 1.15 | 2.05 | 1.25 |
| Ratio: Center of Bottom/Av. Wall | mil/mil | 1.67 | 0.77 | | |

Two kinds of polyethylene were employed in these experiments: Resin A having a 0.930 density, 3.0 melt index, and a $\overline{Mw}/\overline{Mn}$ ratio less than 10 (where $\overline{Mw}$=weight average molecular weight and $\overline{Mn}$=number average molecular weight); and Resin B having 0.914 density, a 1.8 melt index, and a $\overline{Mw}/\overline{Mn}$ ratio of about 40. The novel assist-plug described above is called "Plug II" in Table I. For comparison, a standard plug suitable for forming polystyrene was employed; this plug, which was designed according to FIGURE 1, had a height of 4 inches, a diameter at the top of 3 inches, and was tapered to a diameter of 2½ inches at the bottom; sides and bottom were joined by a corner of ⅛ inch radius of curvature. For these experiments the forming die and assist plug were mounted on a 24-inch by 24-inch plug-assist forming unit of the type manufactured by Brown Machine Co., although any similar forming unit may be employed without altering the results.

The superior results obtained with this process employing this novel assist-plug may be readily seen from examination of Table I. Thus with Resin A, using a standard assist-plug in Run I, the ratio of the thickness of the center of the bottom of the fabricated container to the thickness of the corner was 2.22; by comparison in Run II, using a Plug II, constructed as described above, this ratio was 1.15. For the same two runs, the ratios of the thickness of the bottom to the wall thickness was 1.67 and 0.77, respectively. Similar results were achieved with Resin B in Runs III and IV. In every case using the novel Plug II these ratios are 1.0±0.3 while with the standard prior art Plug I, these ratios are 2.0±0.3. Thus the containers fabricated according to the process of this invention have relatively uniform wall thickness over the sides and bottom in marked contrast with the unsatisfactory containers fabricated by prior art processes employing a standard assist-plug.

Other articles which are representative of some of the shapes which can be fabricated by the process of this invention are indicated in FIGURES 4–B, 4–C, and 4–D, thus C is representative of rectilinear articles which may be fabricated by this process. For the fabrication of such articles, a generally rectilinear assist-plug is commonly preferred. In such cases, the cavity hollowed out of the nose of the plug may be hemispherical or conical, as in the foregoing example, but it is preferable to make it a pyramidal cavity having, as before, a surface area between 40% and 100% of the area of the bottom of the forming die. FIGURE D is a container having 0° tapered walls and a depth-to-base diameter ratio of 2; fabrication of this container may be carried out either by use of an assist-plug of the type shown in FIGURE 5 in which hot compressed gas is fed through an assist-plug to blow a bubble of the resin from the bottom of the plug down into the forming die cavity as the plug descends into the cavity or by use of plug with a hollowed cavity in its nose as described in FIGURE 2. Both methods employ differential air pressure to effect the process of this invention.

While this invention has been illustrated by certain specific examples, it is not limited to these specific examples. Thus it is obvious that an infinite variety of concave hollow shapes may be fabricated employing the teachings of this invention with respect to a process for predrawing the portion of the resin on the bottom of the assist-plug by the use of differential air pressure. Furthermore, as stated hereinabove, while some examples have illustrated an assist-plug having an internal, conical surface hollowed out inside the tapered end of the plug, other generally concave surfaces such as hemispherical, hemi-ellipsoidal and pyramidal may be employed with equally satisfactory results provided only that the surface areas of these cavities are from 40% to 100% of the surface area of the bottom of the forming die and that ports at the apex of the cavity are provided opening into a region of lower pressure.

In the operation of the novel vacuum thermoforming process of this invention, it is sometimes desirable, particularly when very thick sheets of a resin of very high melt viscosity are to be formed, to apply a vacuum, instead of atmospheric pressure, to the ports at the apex of the plug-cavity during the descent of the plug into the forming die. In such a case, the vacuum in the assist-plug will, of course, be replaced by atmospheric pressure during the next portion of the forming cycle when the vacuum is applied instead to the surface of the forming die to draw the resin off from the assist-plug.

Where there is any tendency for the hot thermoplastic resin to stick to the assist-plug when vacuum is applied to the forming die surface, it is sometimes advantageous to provide the novel assist-plug with a thin coating (0.1 to 2 mils thick) of polytetrafluoroethylene resin to prevent such sticking. However, if the tendency to stick is only slight, this can usually be overcome by raising the temperature of the assist-plug a few degrees.

In carrying out the process of this invention, it has been observed that a smoother, better-appearing surface can be obtained on the fabricated articles when the surface of the forming die does not have a mirror-smooth finish but rather has been treated by a liquid-honing process to give what is commonly referred to as a "satin" finish. This honing process employs a slurry in water of glass beads of less than 230 mesh which slurry is impinged on the forming surface by a suitable compressed air gun. The "satin" finish prevents entrapment of tiny air bubbles between the thermoplastic resin and the walls of the die during the vacuum cycle of the forming process.

While the use of this novel vacuum thermoforming process has been illustrated for sheets of polyethylene resins, it is applicable and advantageous for use with many other types of thermoplastic resin sheets, including sheets of higher density of polyethylene resins, of polymethylmethacrylate resins, nylon resins, polyvinyl chloride resins, cellulose acetate and cellulose butyrate resins, and thermally-stable, high molecular weight polyoxymethylene resins of the type described in U.S. Patent 2,768,994 issued on October 30, 1956, to R. N. MacDonald. The great value of this process is that, with any of these resins, it provides means for obtaining, economically, the required stiffness in the thermoformed article by putting a greater percentage of the thermoplastic resin in the side walls of the shaped article and a lesser percentage of the resin in the bottom wall where it is least effective in providing stiffness.

I claim:

1. A method for deep-draw, plug-assist vacuum thermoforming of a hollow article having walls and bottom of uniform thickness which comprises the steps of (1) clamping a sheet of thermoplastic resin in a frame; (2) softening the sheet by heating by means of radiant heat; (3) pressing the softened sheet tightly over the top surface of a forming die, which has a hollowed-out cavity in the shape of the desired article, to form a seal around the outside of the opening to the concave forming surface; (4) subjecting the softened thermoplastic resin sheet to a simultaneous, dual predrawing step which consists of mechanically drawing the portions of the thermoplastic sheet which will form the sides of the shaped article by insertion of the assist plug while simultaneously drawing the portion of the sheet which will form the bottom of the shaped article by the application of a differential gas pressure, through a passage in the assist plug, to the opposite sides of the portion of the sheet which will form the bottom of the article, the simultaneous mechanical and differential gas pressure drawing being balanced to predraw both the side and bottom portions to substantially the same thickness; and (5) subsequently subjecting the predrawn thermoplastic sheet to a final uniform drawing and shaping step by the application of a vacuum through small ports in the concave forming surface of the die to draw the thermoplastic sheet against the concave forming die surface which is maintained at a temperature below the softening temperature of the resin, whereby the thermoplastic resin is set in the shape of the die.

2. A method according to claim 1 in which the thermoplastic resin comprises a polyethylene resin.

References Cited in the file of this patent

UNITED STATES PATENTS

| | | |
|---|---|---|
| 2,282,423 | Kopitke | May 12, 1942 |
| 2,912,718 | Thiel | Nov. 17, 1959 |

FOREIGN PATENTS

| | | |
|---|---|---|
| 220,241 | Australia | Feb. 16, 1959 |

UNITED STATES PATENT OFFICE

CERTIFICATE OF CORRECTION

Patent No. 2,990,581                                                 July 4, 1961

Arthur George Rowe, Jr.

It is hereby certified that error appears in the above numbered patent requiring correction and that the said Letters Patent should read as corrected below.

Column 7, line 45, after "plug" insert -- a --.

Signed and sealed this 21st day of November 1961.

(SEAL)
Attest:

ERNEST W. SWIDER                                     DAVID L. LADD
Attesting Officer                                         Commissioner of Patents

USCOMM-DC